(12) United States Patent
Tyan et al.

(10) Patent No.: US 9,598,107 B2
(45) Date of Patent: Mar. 21, 2017

(54) LIGHTWEIGHT VEHICLE BEAM

(71) Applicant: Ford Global Technologies, LLC, Dearborn, MI (US)

(72) Inventors: Tau Tyan, Northville, MI (US); Yu-Kan Hu, Ypsilanti, MI (US); Leonard Anthony Shaner, New Baltimore, MI (US); Saeed David Barbat, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/813,501

(22) Filed: Jul. 30, 2015

(65) Prior Publication Data

US 2015/0336612 A1   Nov. 26, 2015

Related U.S. Application Data

(62) Division of application No. 13/308,782, filed on Dec. 1, 2011, now Pat. No. 9,126,628.

(51) Int. Cl.
*B62D 21/00* (2006.01)
*B62D 21/04* (2006.01)
(Continued)

(52) U.S. Cl.
CPC .............. *B62D 21/00* (2013.01); *B21D 5/00* (2013.01); *B21D 35/006* (2013.01); *B21D 47/01* (2013.01);
(Continued)

(58) Field of Classification Search
CPC ........ B62D 21/00; B62D 21/02; B62D 21/03; B21D 35/006
(Continued)

(56) References Cited

U.S. PATENT DOCUMENTS

| 169,699 A | 11/1875 | Hazelton |
|---|---|---|
| 6,302,478 B1 | 10/2001 | Jaekel et al. |

(Continued)

FOREIGN PATENT DOCUMENTS

| JP | 10045023 A | 2/1998 |
|---|---|---|
| JP | 2002012165 A | 1/2002 |

(Continued)

*Primary Examiner* — Jason S Morrow
*Assistant Examiner* — E Turner Hicks
(74) *Attorney, Agent, or Firm* — Raymond L. Coppiellie; Brooks Kushman P.C.

(57) ABSTRACT

Several different cross sections of beam having more than four sides are disclosed that may form a central portion of a beam having end portions that have four sides. The end portions of the beams may be received by frame rails. The central portion of the beam between the frame rails may be formed with more than four sides. The additional sides may be recessed beads or protruding ribs. Beams having arcuate recesses or arcuate ribs may be provided on the central portion of the beam. The end portions of the beams may extend outboard of the frame rails. The ribs or beads on the central portion of the beam may provide equivalent performance to four-sided beams having considerably thicker walls. Weight reduction is achieved because the central portion is made of a thinner material while retaining strength by forming beads or ribs in the central portion.

12 Claims, 6 Drawing Sheets

(51) Int. Cl.

| | | |
|---|---|---|
| *B62D 27/02* | (2006.01) | |
| *B21D 5/00* | (2006.01) | |
| *B23K 31/02* | (2006.01) | |
| *B21D 35/00* | (2006.01) | |
| *B21D 47/01* | (2006.01) | |
| *B21D 53/88* | (2006.01) | |
| *B62D 21/15* | (2006.01) | |
| *B62D 25/00* | (2006.01) | |

(52) U.S. Cl.
CPC ............ *B21D 53/88* (2013.01); *B23K 31/027* (2013.01); *B62D 21/04* (2013.01); *B62D 21/15* (2013.01); *B62D 25/00* (2013.01); *B62D 27/023* (2013.01); *Y10T 29/49622* (2015.01)

(58) Field of Classification Search
USPC ...... 296/205, 187.8, 193.04, 193.07, 203.01, 296/204, 203.02, 203.03, 203.04, 29, 296/184.1; 280/800, 781, 785, 797, 798, 280/796, 786
See application file for complete search history.

(56) References Cited

U.S. PATENT DOCUMENTS

| | | | | |
|---|---|---|---|---|
| 6,722,037 | B2* | 4/2004 | Nees | ............... B60J 5/0444 29/897.2 |
| 7,971,887 | B2* | 7/2011 | Dorr | ............... B62D 21/11 164/111 |
| 2001/0050497 | A1* | 12/2001 | Jaekel | ............... B62D 23/005 296/205 |
| 2005/0013954 | A1* | 1/2005 | Kaegi | ............... B21C 37/065 428/36.9 |
| 2010/0123337 | A1* | 5/2010 | Tamura | ............... B62D 25/02 296/203.03 |
| 2010/0289300 | A1* | 11/2010 | Kokubo | ............... B21D 39/04 296/205 |
| 2011/0015902 | A1 | 1/2011 | Cheng et al. | |

FOREIGN PATENT DOCUMENTS

| | | |
|---|---|---|
| JP | 2006021236 A | 1/2006 |
| JP | 2008284931 A | 11/2008 |
| JP | 2010089576 A | 4/2010 |

\* cited by examiner

LIGHTWEIGHT VEHICLE BEAM

CROSS-REFERENCE TO RELATED APPLICATIONS

This application is a division of U.S. application Ser. No. 13/308,782, now U.S. Pat. No. 9,426,628, filed Dec. 1, 2011 the disclosure of which is hereby incorporated in its entirety by reference herein.

TECHNICAL FIELD

This disclosure relates to beams in vehicles that provide improved reaction forces against bending loads and crush loads.

BACKGROUND

A wide variety of beams are incorporated in vehicle structures. Transverse or cross car beams may be provided that extend between longitudinal frame rails or integrally formed rails. Pillars are beams that support the roof of a vehicle to resist crush loads. Bumper support beams extend between a vehicle frame and front or rear bumpers to absorb energy in front end or rear end impacts. There is a general need to reduce the weight of vehicles to improve fuel economy, and exhaust emissions. Concomitantly, vehicle safety standards require strengthening of beams and increasing energy absorption. Stronger lighter-weight materials are being incorporated in vehicle beams primarily by changing the material of the beams. However, merely changing materials is not thought to be sufficient to minimize weight while improving bending resistance and crush load absorption.

Beams having more than four sides have been developed in an effort to reduce weight while improving bending strength and crush resistance. For example, beams having 12 to 20 sides have been proposed that increase the strength of the beam. One problem presented by these types of beams is that joining the beams to other frame parts requires forming irregular shaped brackets and receptacles. Irregular brackets and receptacles are more difficult to form and require costly manufacturing processes.

The present disclosure is directed to achieving fuel economy driven weight reduction in vehicle beams and structural members while maximizing bending strength and crush load energy absorption in vehicles.

SUMMARY

One aspect of this disclosure relates to the concept of providing beams for vehicles that have regularly shaped four-sided end portions that are integrally formed with a central portion that have more than four sides. The end portions may be received in conventional four-sided openings or in brackets that receive the four-sided beams in a conventional bracket design. A central portion of the beam may include six or more sides. For example, twenty sides may be provided by forming a bead in each of four sides of a four-sided beam with the bead providing three additional sides in each side of the four sided beam blank. In one embodiment, the central portion of the beam may be formed of a thinner material with the end portions being formed of a thicker material than the central portion. Such a beam may be formed from a tailor welded blank that has increased material thickness at the end portions and reduced material thickness in the central portion.

The beads formed in the central portion may be formed by discontinuous, or 3D flexible, roll forming processes that roll form or otherwise form the beads in the central portion of a tubular beam that are not required to extend into the end portion or do not extend fully to the end portions. The beads may be formed as recesses in the sides of the central portion to improve crush resistance. Alternatively, the beads may be formed to protrude from the sides of the central portion of the blank to provide improved bending resistance in the beam.

A twenty sided beam can be provided by forming a bead including three flat walls in each of four sides of a rectangular blank. Alternatively, a twelve sided beam with an arcuate recess or arcuate rib may be provided. Beams with fewer or a greater number of sides may be provided according to other adaptations of the disclosure.

According to one aspect of the disclosure, a beam for a vehicle is provided that has a central portion having more than four sides with a wall thickness $T_1$, and a pair of outboard portions having four sides with a wall thickness of $T_2$ that is thicker than $T_1$. For example, the beam may be formed with a central portion with walls wherein $T_1$ is 1.5 mm thick and $T_2$ is 1.8 mm thick. A pair of continuous welds may be provided between the outboard portions and the central portion of a tailor welded blank.

The central portion of the beam may have at least one bead formed in at least one side of the central portion. At least one bead may be formed in each of the sides of the central portion. Each bead may be recessed into the side of the beam to increase the crush resistance of the beam. Alternatively, the bead may protrude from the side of the beam to increase the bending resistance of the beam. The bead may have a pair of oppositely oriented tapered walls and a central portion. In another embodiment, the bead may have an arcuate cross section.

The vehicle may have a pair of spaced frame rails that each define a four sided aperture, wherein the outboard portions of the beam may be received in the four sided aperture and secured to the frame rails about the openings. Each of the outboard portions of the beam may extend through a pair of four sided apertures defined in parallel walls of each of the spaced frame rails with the outboard portions extending outwardly from the frame rails. The central portion may extend to the inner walls of the frame rails.

According to another aspect of the disclosure a method of making a hollow beam from a tailor welded blank is disclosed. According to the method, the tailor welded blank selected may have a central portion and a pair of outboard portions that are of a different thickness than the central portion. The tailor welded blank is formed into a tube and a bead is formed in the central portion by a hydro-forming process to strengthen the central portion. The bead provides additional walls in the central portion of the walls.

The method of forming the blank may further comprise bending the blank to form the blank into a tubular shape, and welding the blank to form the tubular shape into a four sided tube. The central portion may be formed by walls with a thickness $T_1$ and the outboard portions may be formed by walls having a thickness $T_2$ that is thicker than $T_1$. The thickness $T_1$ may be between 1.0 mm and 2.5 mm and the thickness $T_2$ may be between 1.5 mm and 3.5 mm.

According to an alternative embodiment of the method of making a hollow beam, a tubular tailor welded blank is selected that has a central portion and a pair of outboard portions. A bead is formed by discontinuous, or 3D flexible, roll forming or stamping the central portion of the tubular blank in at least one of the walls without forming a rib in the outboard portions.

The above aspects of the disclosure and other aspects will be apparent to one of ordinary skill in the art in view of the attached drawings and the following detailed description of the illustrated embodiments.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the present invention.

Figure 1:
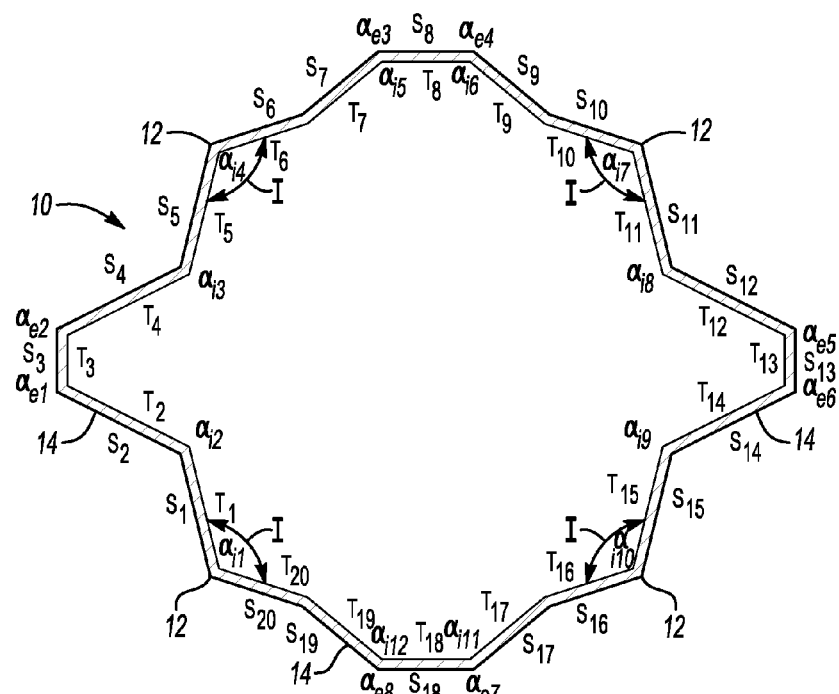
FIG. 1 is a cross-sectional view of one embodiment of a 20-sided beam.

Referring to FIG. 1, a 20-sided, 20-cornered beam made according to one embodiment of the present invention, is illustrated. The sides of the beam 10 have a length of $S1-S_{20}$ that each have a thickness of $T_1-T_{20}$. The different side lengths, thickness, and angles are tunable parameters that allow the beam to be fine-tuned to control crush strength and bending resistance. These parameters may also be tuned to create preferred crush and bending modes for structures that are not uniform and not straight. The beam 10 includes main corners 12. The main corners 12 have an internal angle indicated by "$\alpha$". The internal angle $\alpha$ is preferably greater than 90°. The internal angle may be between 95° and 125° as measured from the inside of the main corners 12. Between each of the main corners 12, a flat wall bead 14 is provided to increase the strength of the beam 10.

Figure 2:
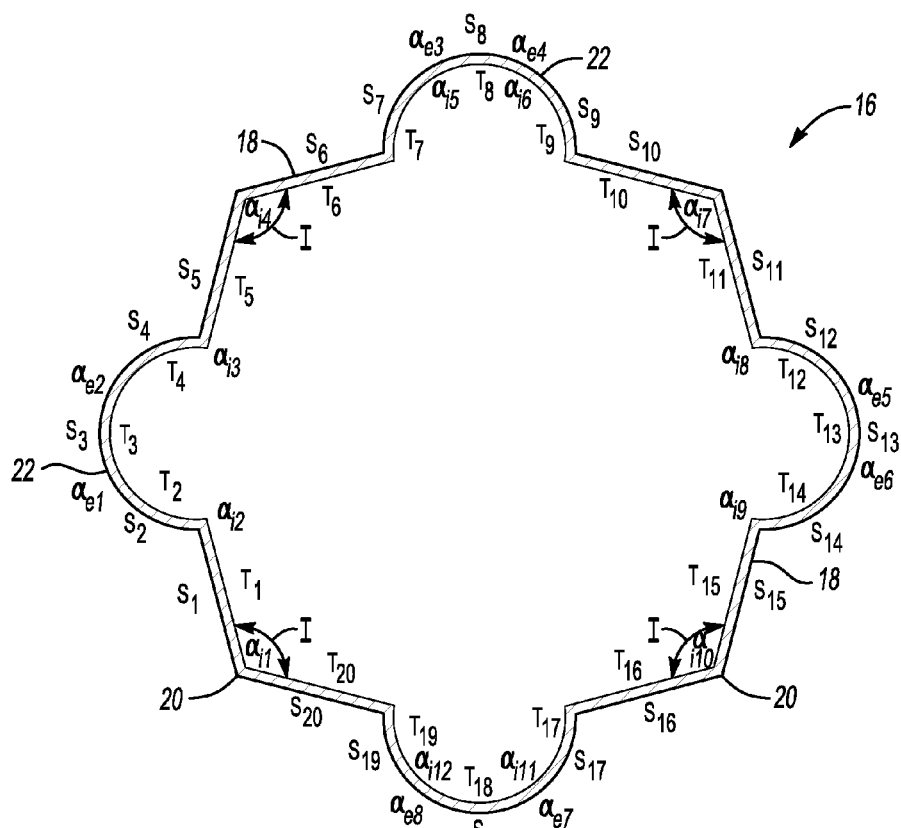
FIG. 2 is a cross-sectional view of an 8-sided beam with arcuate protruding ribs.

Referring to FIG. 2, a 12-sided beam 16 is shown that includes eight flat walls 18 with two flat walls 18 being provided on opposite sides of each of the main corners 20. Four protruding arcuate ribs 22 are provided between the two flat walls 18 that are disposed between each of the main corners 20. The ribs 22 are arcuate walls that form four additional sides of the beam 16. The main corners 20 have an internal angle $\alpha$ that is greater than 90° and may be within 95° and 125° as measured from inside the main corners 20.

Referring to the embodiments of FIGS. 1 and 2, both provide a tunable parameter to optimize bending performance. The lengths of the sides $S_1$-$S_{20}$, thicknesses $T_1$-$T_{20}$ (Radii of the ribs in FIG. 2) and angles $\alpha_1$-$\alpha_{20}$ are tunable to control crush or bending performance. The parameters are also tunable to meet packaging space requirements and load requirements for vehicle architectures.

Figure 3:
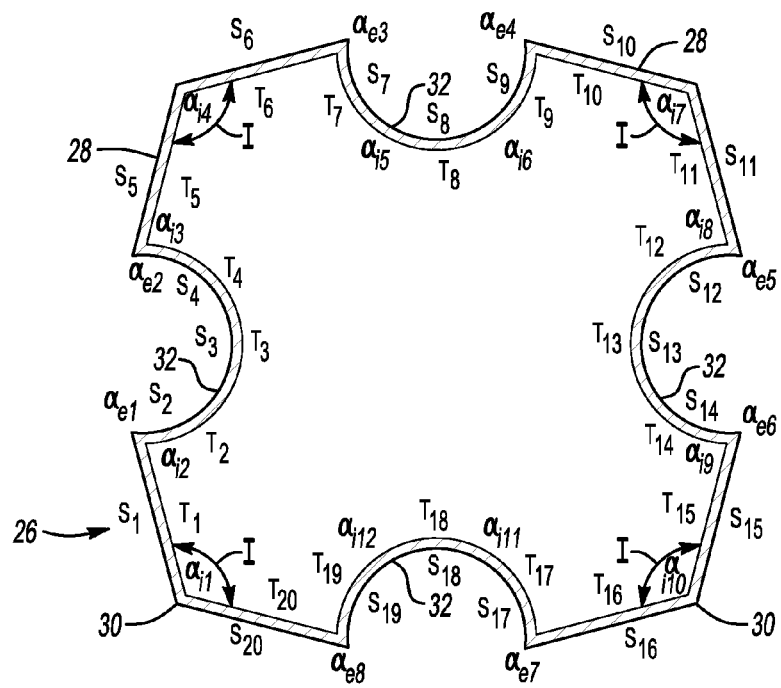
FIG. 3 is a cross-sectional view of an 8-sided beam with arcuate recessed beads.

Referring to FIG. 3, another alternative embodiment of the invention is shown that includes a 12-sided beam 26. Eight flat walls 28 are provided on opposite sides of each of the main corners 30. The main corners 30 have an inside angle dimension a of greater than 90° and the inside angle may be between 95° and 125°. Arcuate recesses 32 forming four arcuate walls are provided between the two walls 28 between each of the main corners 30. The embodiment of FIG. 3 including arcuate recesses may be preferable for crush load resistance while the 8-sided beam 16, shown in FIG. 2 with protruding arcuate ribs 22, offer improved bending moment resistance.

Figure 4:
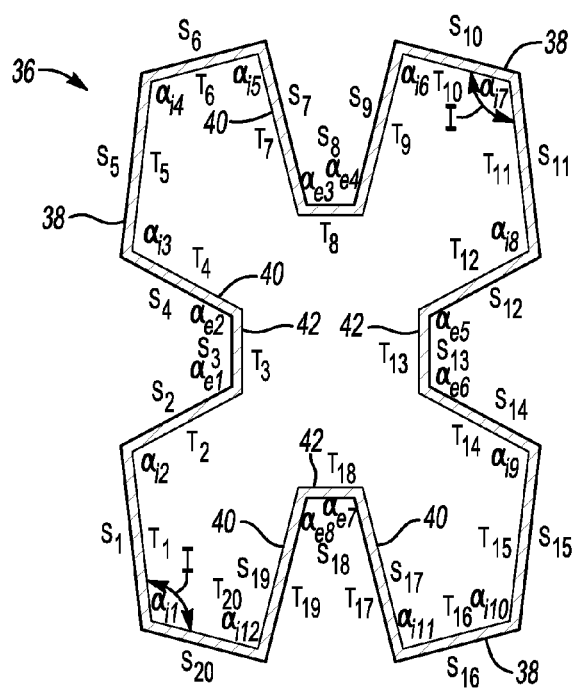
FIG. 4 is a cross-sectional view of a 20-sided beam with flat walled recessed beads.

Referring to FIG. 4, a 20-sided non-traditional cross section beam is generally referred to with reference numeral 36. The beam 36 includes outer walls 38 that generally define the outer periphery of the beam 36 Inner side walls 40 extend between the outer walls 38 and the inner base walls 42. Four main corners 44 are provided between each of the outer walls 38. The internal angle $\alpha$ of the main corners 44 is greater than 90° and may be between 95° and 125°.

Referring further to FIG. 4, the 20 sides of the 20-sided beam are labeled $S_1$-$S_{20}$ and the length of sides $S_1$, $S_2$, $S_4$, $S_5$, $S_6$, $S_7$, $S_9$, $S_{10}$, $S_{11}$, $S_{12}$, $S_{14}$, $S_{15}$, $S_{16}$, $S_{17}$, $S_{19}$ and $S_{20}$ are each equal to a length $L_0$. Sides $S_3$, $S_8$, $S_{13}$, and $S_{18}$ may each equal a length $L_1$. Applicant has found that the optimal ratio $L_1/L_0$ is between 0.66 and 2.0.

FIGS. 1 and 2 illustrate examples of beams having outboard beads on all four sides of a four-sided beam. FIGS. 3 and 4 illustrate examples of beams having inboard beads on all four sides. These examples may be modified to provide a beam having inboard beads on two sides with two outboard beads on two sides. Alternatively, two inboard beads may be provided on two opposite sides or two outboard beads may be provided on the approved sides. The above are examples of non-uniform cross section with different tunable parameters.

Figure 5:
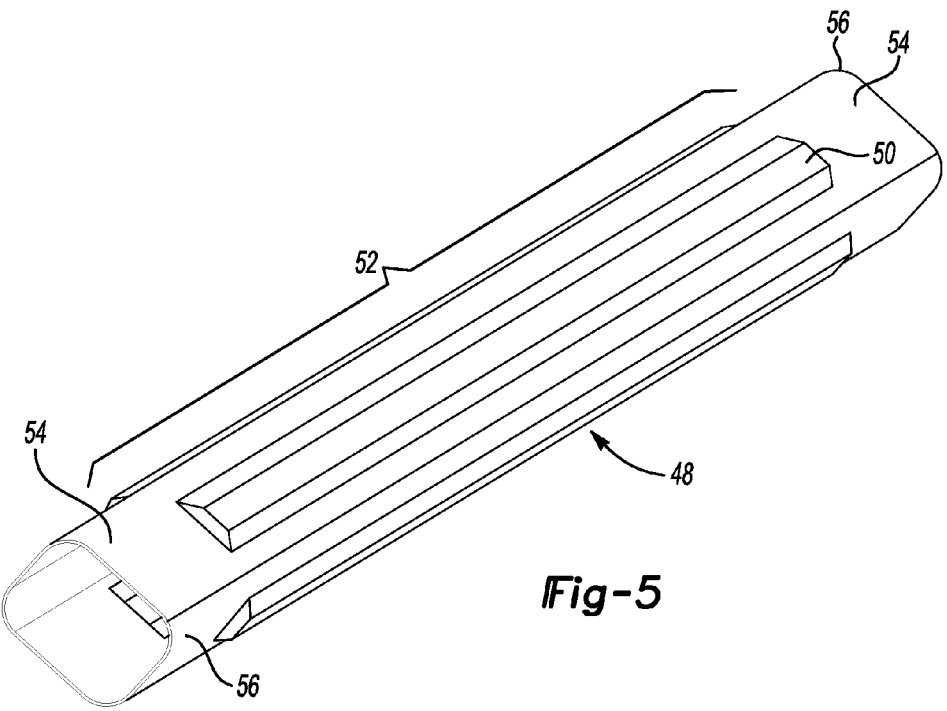
FIG. 5 is a perspective view of a beam having a 20-sided central portion.

Referring to FIG. 5, a beam 48 with a 20-sided central portion is illustrated. The beam 48 includes flat wall external ribs 50 that are limited to the central portion 52 of the beam 48. Four-sided end portions 54 are provided on both sides of the central portion 52. The four-sided end portions 54 may have rounded corners 56.

Figure 6:
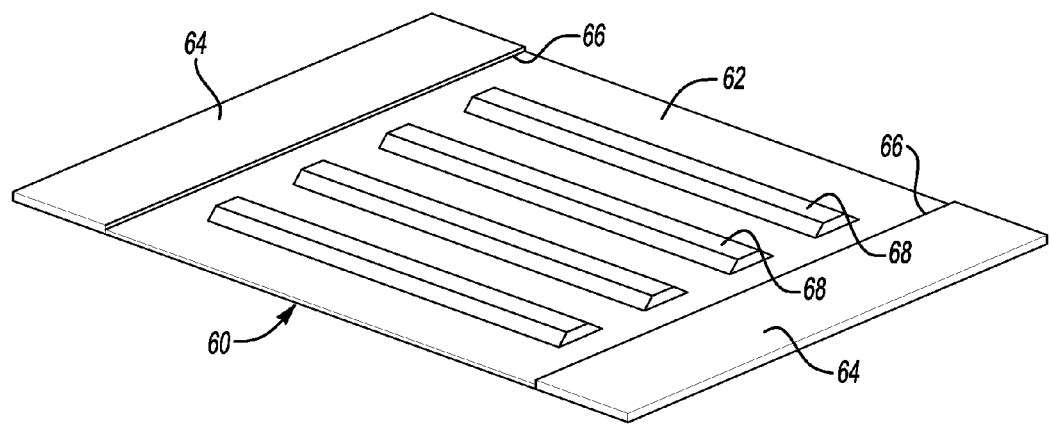
FIG. 6 is a perspective view of a tailor welded blank.

Referring to FIG. 6, a pre-stamped, 3D flexible roll-formed, or discontinuous roll-formed tailor welded blank 60 is shown that may be used to form a tubular beam as described above with reference to FIGS. 1-5. The tailor welded blank 60 includes a central portion 62 that may be of a reduced thickness compared to end portions 64. Butt welds 66 may be provided by laser welding, for example, between the central portion 62 and the end portion 64 as part of the manufacturing process for manufacturing the tailor welded blanks 60. Four beads 68 are shown in the central portion 62 of the tailor welded blank 60. The beads 68 may be recessed beads to provide improved crush resistance performance or may be protruding ribs if the beam is intended to reinforce against bending movements. Weight savings may be achieved with the embodiment of FIG. 6 by providing a thinner central portion 62 that is strengthened by the beads 68. The end portions 64 do not include beads 68 and may be made of a thicker material to provide strength equivalent to the strength of the central portion 62 while limiting the amount of thicker material required in the end portions 64.

Figure 7:
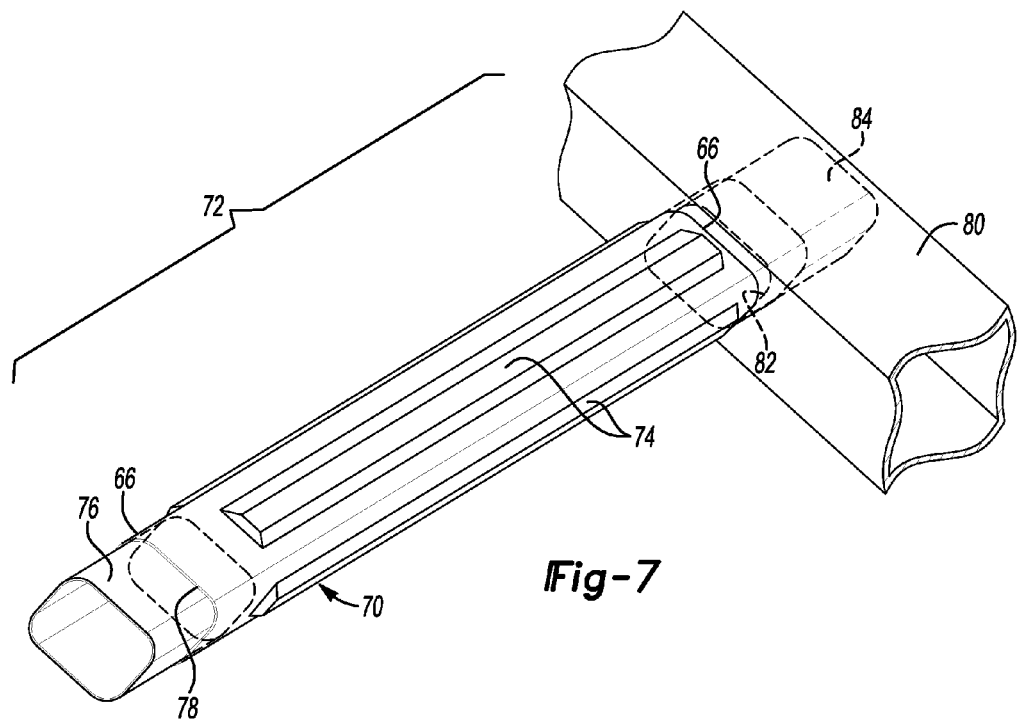
FIG. 7 is a perspective view of a tubular beam with a 20-sided central portion.

Referring to FIG. 7, a tubular beam 70 is shown that is one example of a beam that may be manufactured beginning with the tailor welded blank shown in FIG. 6. The tubular beam 70 has a 20-sided central portion 72 that is reinforced with ribs 74 that extend across the central portion 72. The ribs 74 may be formed, for example, in a hydro-forming process. End portions 76 are provided on opposite ends of the central portion 72. The end portion 76 may be thicker than the material used to form the 20-sided central portion 72. Butt welds 78 are provided between the central portion 72 and the end portions 76 of the tailor welded blank 60 as shown in FIG. 6. A frame rail 80 is shown connected to one end of the tubular beam 70. The frame rail 80 defines an opening 82 that extends through both of the parallel walls of the frame rails 80. The end portions 76 may extend completely through the openings 82 in the frame rails 80 and provide outboard extensions 84. Outboard extensions 84 have been shown to improve the performance of the tubular beam 70, particularly in intrusion tests.

Figure 8:
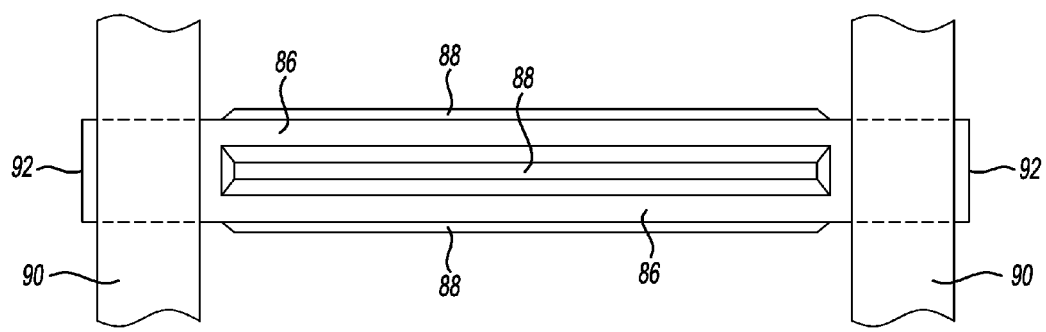
FIG. 8 is a fragmentary plan view of a beam having a 20-sided central portion connected to a pair of frame rails.

Referring to FIG. 8, a beam 86 is shown that includes a plurality of ribs 88. The beam 86 extends between two frame rails 90 and extends beyond the frame rails 90. Extensions 92 extend from the frame rails 90 and may provide improved intrusion test performance, as previously described with reference to FIG. 7.

Figure 9:
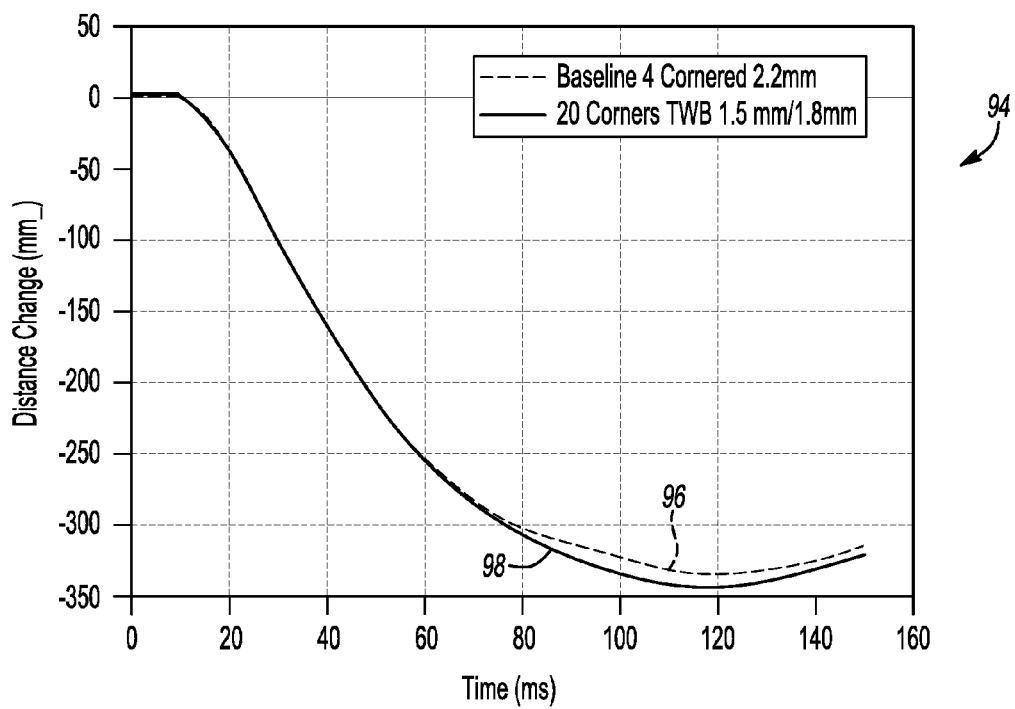
FIG. 9 is a graph of a rocker intrusion from a side pole test.

FIG. 9 is a rocker intrusion chart generally indicated by reference numeral 94. A baseline rocker intrusion from a side pole test illustrates the performance of the four-corner, 2.2 mm thick beam in a rocker intrusion test. The baseline 96 shows the performance of the four-corner 2.2 mm thick beam over a time period of 150 milliseconds with the distance change indicating an intrusion of 350 mm. A test of a reduced weight tailor welded blank 98 having a 1.5 mm thick central portion and a 1.8 mm thick end portion is shown in FIG. 9 to have nearly identical performance in the rocker intrusion test.

Figure 10:
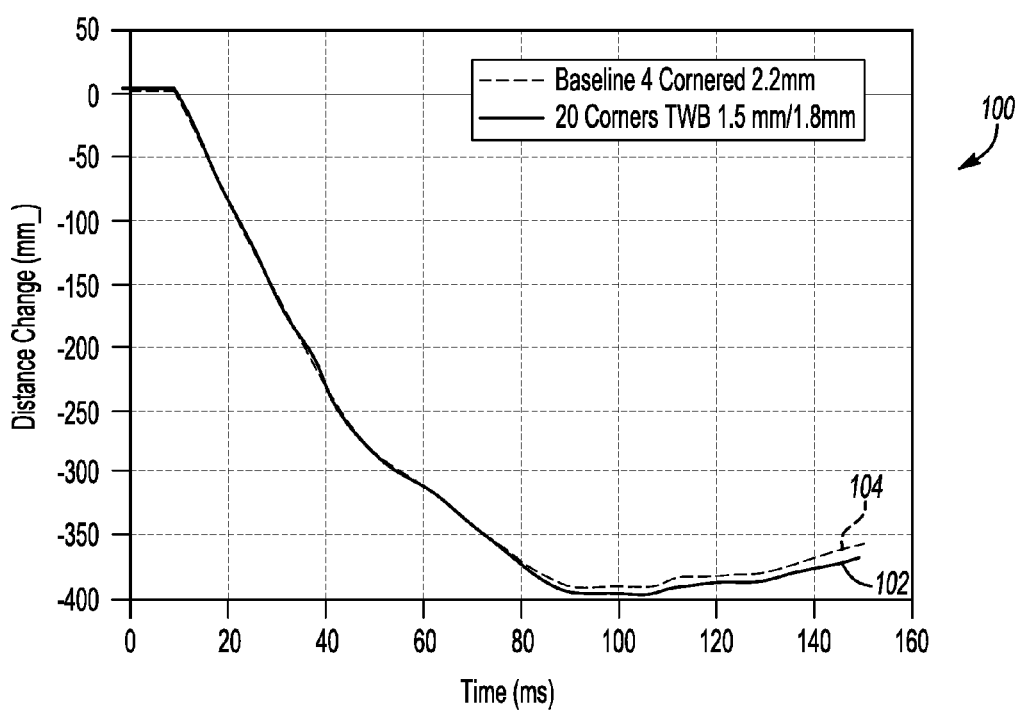
FIG. 10 is a graph of an upper front door intrusion from a side pole test.

Referring to FIG. 10, a front door upper intrusion chart is generally indicated by reference numeral 100. A baseline rocker intrusion test illustrates the performance of the four-corner, 2.2 mm thick beam in a rocker intrusion test. The baseline 104 shows the performance of the four-corner 2.2 mm thick beam over a time period of 150 milliseconds with the distance change indicating an intrusion of 350 mm. A test of a reduced weight tailor welded blank 102 having a 1.5 mm thick central portion and a 1.8 mm thick end portion is shown in FIG. 9 to have nearly identical performance in the rocker intrusion test.

Figure 11:
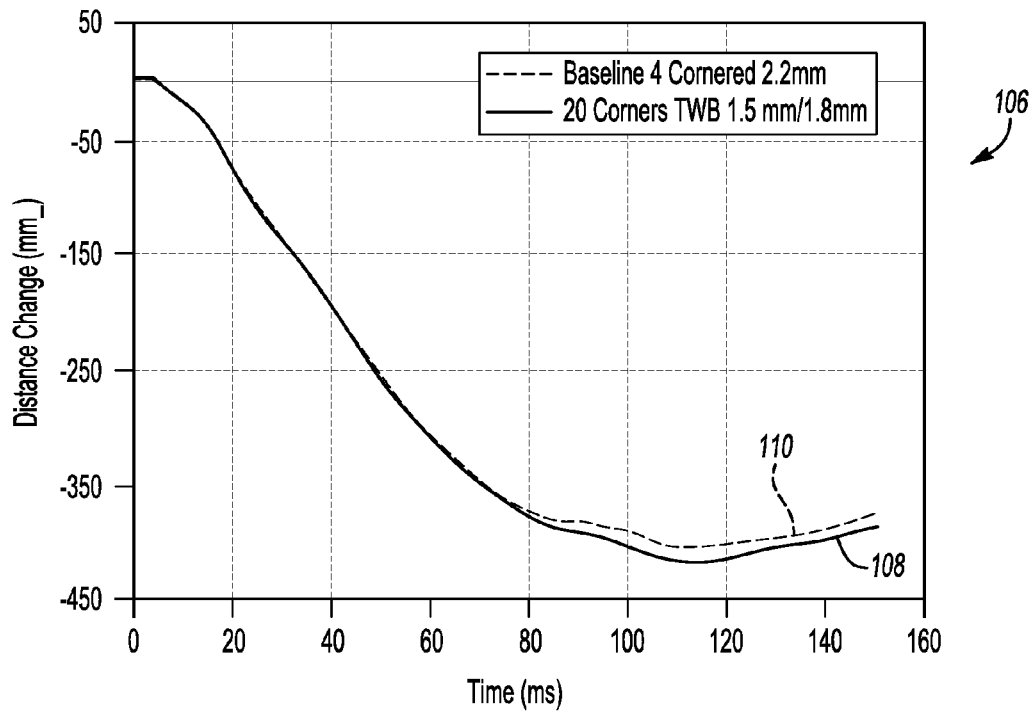
FIG. 11 is a graph of a lower front door intrusion from a side pole test.

Referring to FIG. 11, a front door lower intrusion chart generally indicated by reference numeral 106. A baseline rocker intrusion test illustrates the performance of the four-corner, 2.2 mm thick beam in a rocker intrusion test. The baseline 110 shows the performance of the four-corner 2.2 mm thick beam over a time period of 150 milliseconds with the distance change indicating an intrusion of 350 mm. A test of a reduced weight tailor welded blank 108 having a 1.5 mm thick central portion and a 1.8 mm thick end portion is shown in FIG. 9 to have nearly identical performance in the rocker intrusion test.

Figure 12:
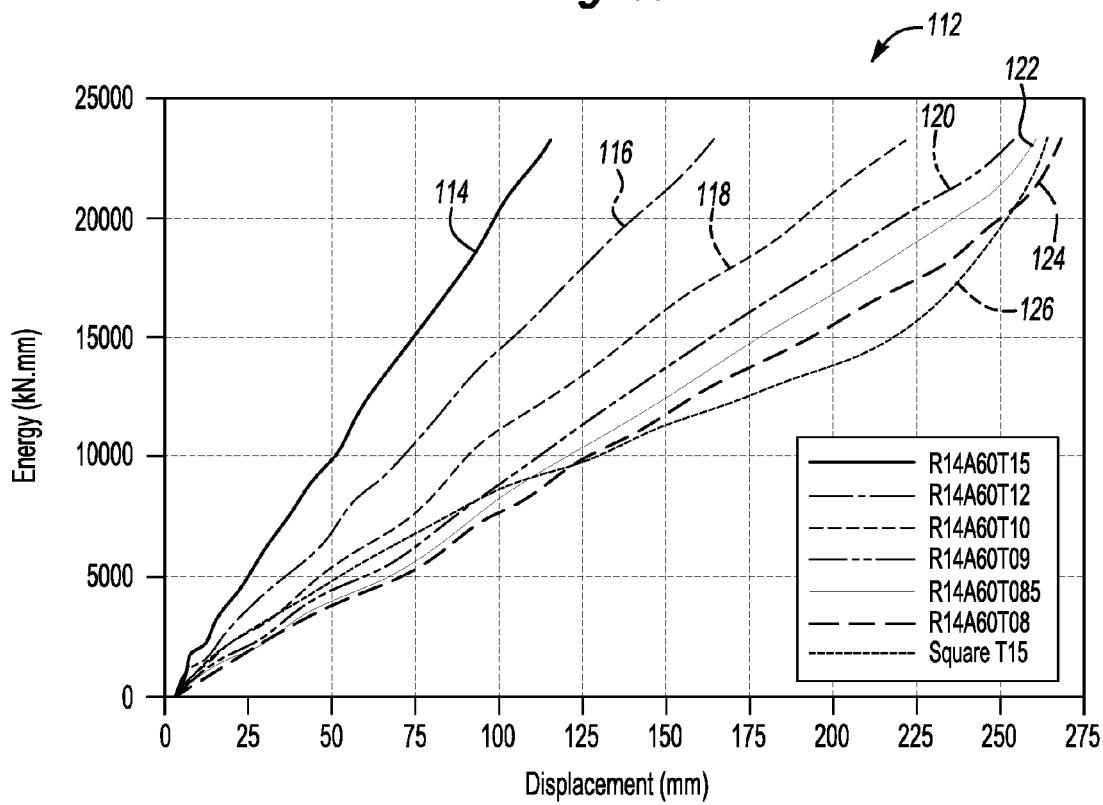
FIG. 12 is a graph comparing crush energy absorption for several beams having a cross section in a central portion corresponding to FIG. 3 with different thicknesses.

Referring to FIG. 12, a crush energy chart is identified by reference numeral 112. The crush energy chart provides a comparison of beams made in accordance with the embodiment of FIG. 3. The beams tested were of identical size and shape, but had different thicknesses. In the crush energy chart 112, line 114 illustrates the performance of a 1.5 mm beam indicating that the displacement in response to 20,000 kN.mm was approximately 100 mm. Line 116 illustrates the performance of a 1.2 mm beam which at 20,000 kN.mm was approximately 138 mm. Line 118 illustrates a 1.0 mm beam in the test and indicates that at 20,000 kN.mm resulted in a displacement of approximately 180 mm. Line 120 illustrates the crush energy performance of a 0.9 mm beam which at 20,000 kN.mm, the displacement was approximately 220 mm. Line 122 illustrates that in the same test a beam having a thickness of 0.85 mm provided energy absorption of 20,000 kN.mm with a displacement of approximately 235 mm. Line 124 illustrates the performance of a 0.8 mm tube made according to FIG. 3 illustrates that energy absorption of 20,000 kN.mm results in displacement of 250 mm. The baseline square tube having a thickness of 1.5 mm performance is shown as line 126. Energy absorbed in the amount of 20,000 kN.mm required a displacement of 250 mm.

Thicker beams having the shape shown in FIG. 3 perform better than the 0.8 mm thickness beams. However, as the chart illustrates, as similar performance to the heavier 1.55 mm baseline beam may be obtained from a 0.8 mm thickness beam having the shape shown in FIG. 3. Surprisingly, line 124 is fully equivalent to a much heavier and thicker square tube illustrated by line 126 which has a 1.5 mm thickness.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A frame assembly for a vehicle comprising:
   a transverse beam including four-sided outboard portions having a wall thickness $T_1$, and a more than four-sided central portion having a wall thickness $T_2$ that is thinner than $T_1$, wherein at least one bead extends inwardly from at least one side of the central portion to increase strength; and
   spaced frame rails each having a four-sided aperture for receiving one of the outboard portions.

2. The frame assembly of claim 1 wherein at least one bead is formed in each of the sides of the central portion, and wherein the beam has a wall length of L1 of the walls adjacent to the bead, the bead has a base wall having a wall length of L2, and wherein the ratio of L1 to L2 is between 0.66 and 2.0.

3. The frame assembly of claim 1 wherein a pair of continuous welds are provided between the outboard portions and the central portion.

4. The frame assembly of claim 1 wherein the central portion further includes twenty sides that each join two adjacent sides at an angle of between 95 and 125°.

5. The frame assembly of claim 1 wherein the at least one bead has a pair of oppositely oriented tapered walls and a base wall.

6. A transverse beam for a vehicle comprising:
   a central portion having more than four sides;
   a pair of outboard portions having no more than four sides;

wherein the central portion has a wall thickness $T_1$ and the pair of outboard portions having a wall thickness of $T_2$ that is thicker than $T_1$, wherein the central portion has at least one bead formed in at least one side of the central portion that forms at least one of the walls, and wherein the bead extends inwardly from the side of the beam to increase the crush resistance of the beam; and wherein the vehicle has a pair of spaced frame rails that each define at least one four sided aperture, wherein each of the outboard portions of the beam are received in one of the four sided apertures and secured to the frame rails about the apertures.

7. The beam of claim 6 wherein $T_1$ is 1.5 mm thick and $T_2$ is 1.8 mm thick.

8. The beam of claim 6 wherein at least one bead is formed in each of the sides of the central portion, and wherein the beam has a wall length of $L_1$ of the walls adjacent to the bead, the bead has a base wall having a wall length of $L_2$, and wherein the ratio of $L_1$ to $L_2$ is between 0.66 and 2.0.

9. The beam of claim 6 wherein a pair of continuous welds are provided between the outboard portions and the central portion.

10. The beam of claim 6 wherein the central portion further comprises twenty sides that each join two adjacent sides at an angle of between 95 and 125°.

11. The beam of claim 6 wherein each of the outboard portions of the beam extend through a pair of four sided apertures defined in parallel walls of each of the spaced frame rails and outboard of the frame rails, wherein the central portion extends to one of the walls of each of the spaced frame rails.

12. The beam of claim 6 wherein the central portion has at least one bead formed in at least one side of the central portion that forms at least one of the walls, and wherein the bead has a pair of oppositely oriented tapered walls and a base wall.

* * * * *